US012687063B2

(12) United States Patent

Matt

(10) Patent No.: US 12,687,063 B2

(45) Date of Patent: Jul. 21, 2026

(54) CABLE DRIVEN POWER TAILGATE SYSTEM

(71) Applicant: FCA US LLC, Auburn Hills, MI (US)

(72) Inventor: Samuel J Matt, Auburn Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 18/976,936

(22) Filed: Dec. 11, 2024

(65) Prior Publication Data

US 2026/0160110 A1     Jun. 11, 2026

(51) Int. Cl.
| | |
|---|---|
| *E05F 15/627* | (2015.01) |
| *B62D 33/027* | (2006.01) |
| *E05F 15/622* | (2015.01) |

(52) U.S. Cl.
CPC ........ *E05F 15/627* (2015.01); *B62D 33/0273* (2013.01); *E05F 15/622* (2015.01); *E05Y 2201/654* (2013.01); *E05Y 2201/71* (2013.01); *E05Y 2900/544* (2013.01)

(58) Field of Classification Search
CPC ... E05F 15/627; E05F 15/622; B62D 33/0273
See application file for complete search history.

(56) References Cited

U.S. PATENT DOCUMENTS

| | | | | | |
|---|---|---|---|---|---|
| 5,352,008 | A | * | 10/1994 | Denvir | B62D 35/001 |
| | | | | | 296/180.1 |
| 5,449,212 | A | * | 9/1995 | Seifert | E05F 15/622 |
| | | | | | 49/357 |
| 5,531,498 | A | * | 7/1996 | Kowall | E05F 15/627 |
| | | | | | 49/358 |
| 6,206,444 | B1 | * | 3/2001 | Casey | B60R 11/00 |
| | | | | | 296/180.1 |
| 7,677,628 | B2 | * | 3/2010 | Lowentat | E05F 15/627 |
| | | | | | 296/57.1 |
| 9,522,704 | B1 | | 12/2016 | Krajenke et al. | |
| 10,808,433 | B2 | | 10/2020 | Im et al. | |
| 11,220,301 | B2 | | 1/2022 | Robinson et al. | |
| 2004/0212210 | A1 | * | 10/2004 | Roach | B62D 33/0273 |
| | | | | | 296/57.1 |
| 2007/0132264 | A1 | | 6/2007 | Koneval et al. | |
| 2007/0262603 | A1 | * | 11/2007 | Robertson | B62D 33/0273 |
| | | | | | 296/57.1 |
| 2008/0066385 | A1 | * | 3/2008 | Roach | E05F 1/1091 |
| | | | | | 49/386 |
| 2009/0217596 | A1 | * | 9/2009 | Neundorf | E05B 79/20 |
| | | | | | 49/506 |

(Continued)

FOREIGN PATENT DOCUMENTS

| | | | |
|---|---|---|---|
| DE | 102013114590 A1 | 6/2014 |
| DE | 102015224224 B4 | 9/2023 |

(Continued)

*Primary Examiner* — Gregory J Strimbu

(74) *Attorney, Agent, or Firm* — Jeremy J. Klobucar

(57) ABSTRACT

A cable driven power tailgate system has at least one cable connected with a truck box for raising and lowering a tailgate of a vehicle. A motor/actuator drives the at least one cable to move the tailgate into a closed position. At least one nut on a spindle, the nut connected with the at least one cable. The spindle rotates in response to the at least one cable movement to move the tailgate into an open position.

6 Claims, 2 Drawing Sheets

(56) References Cited

U.S. PATENT DOCUMENTS

| | | | | |
|---|---|---|---|---|
| 2011/0057469 A1* | 3/2011 | Zielinsky | ............... | B60P 1/267 |
| | | | | 296/57.1 |
| 2016/0160553 A1 | 6/2016 | Nania | | |
| 2021/0172211 A1* | 6/2021 | Rosales | .................. | E05B 81/64 |

FOREIGN PATENT DOCUMENTS

| | | | |
|---|---|---|---|
| DE | 102020200648 B4 | 5/2024 |
| EP | 3162998 A1 | 5/2017 |
| KR | 101134372 B1 | 4/2012 |

* cited by examiner

CABLE DRIVEN POWER TAILGATE SYSTEM

FIELD

The present disclosure relates to automotive vehicles and, more particularly, to pickup trucks including a cable driven power tailgate.

BACKGROUND

This section provides background information related to the present disclosure which is not necessarily prior art.

Power tailgate systems exist in the art. These systems generally utilize a direct drive at the hinge of the tailgate. However, this design has packaging restraints due to the positioning of the direct drive. Thus, the direct drive is positioned adjacent the side of the tailgate at the hinge.

Additionally, existing power tailgate systems do not have a mechanical advantage due to the driven hinge. Also, these systems suffer from cable slack. Generally, cable slack varies from side to side of the tailgate due to tolerancing. Thus, these disadvantages exist in power tailgates in the art and, there is a desire to provide a system that provides good mechanical advantage while eliminating package constraints and eliminating cable slack.

The present disclosure provides a power tailgate system that enables parts of the system to be packaged in open areas of the tailgate. This eliminates the packaging constraints in critical areas. Also, the present design enables a mechanical advantage away from the hinge to provide a system that may be utilized on a variety of tailgates within different mass and center of gravity. The present disclosure eliminates the variation and tolerance slack so that cable is the same length in the open position without slack present in current designs.

SUMMARY

This section provides a general summary of the disclosure, and is not a comprehensive disclosure of its full scope or all of its features.

According to a first aspect of the disclosure, a cable driven power tailgate system comprises at least one cable connected with a truck box for raising and lowering a tailgate of a vehicle. A motor/actuator drives the at least one tailgate into a first position wherein the cable moves the tailgate into a closed position. At least one nut is on a spindle. The nut is connected with the at least one cable. The spindle rotates in response to the movement of the at least one cable to move the tailgate into an opened position. One or more tensioners is coupled with the at least cable to keep the cable and tension at all times during operation. A gear box is coupled with the spindle to control speed of rotation of the spindle and lowering of the tailgate. The at least one nut moves between a first and second position for rotating the spindle to enable opening the tailgate and to enable raising of the tailgate to a closed position. The motor actuator is positioned near the center of the tailgate. Also, the spindle is positioned near a pivot end of the tailgate.

According to a second aspect of the disclosure, a vehicle tailgates comprises a door that includes latches, one on each side. The latches secure with a cargo box to secure the tailgate in a closed position. A cavity is in the door. A cable driven power tailgate system comprises at least one cable connected with a truck box for raising and lowering a tailgate of a vehicle. A motor/actuator drives the at least one tailgate into a first position wherein the cable moves the tailgate into a closed position. At least one nut is on a spindle. The nut is connected with the at least one cable. The spindle rotates in response to the movement of the at least one cable to move the tailgate into an opened position. One or more tensioners is coupled with the at least cable to keep the cable and tension at all times during operation. A gear box is coupled with the spindle to control speed of rotation of the spindle and lowering of the tailgate. The at least one nut moves between a first and second position for rotating the spindle to enable opening the tailgate and to enable raising of the tailgate to a closed position. The motor actuator is positioned near the center of the tailgate. Also, the spindle is positioned near a pivot end of the tailgate.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
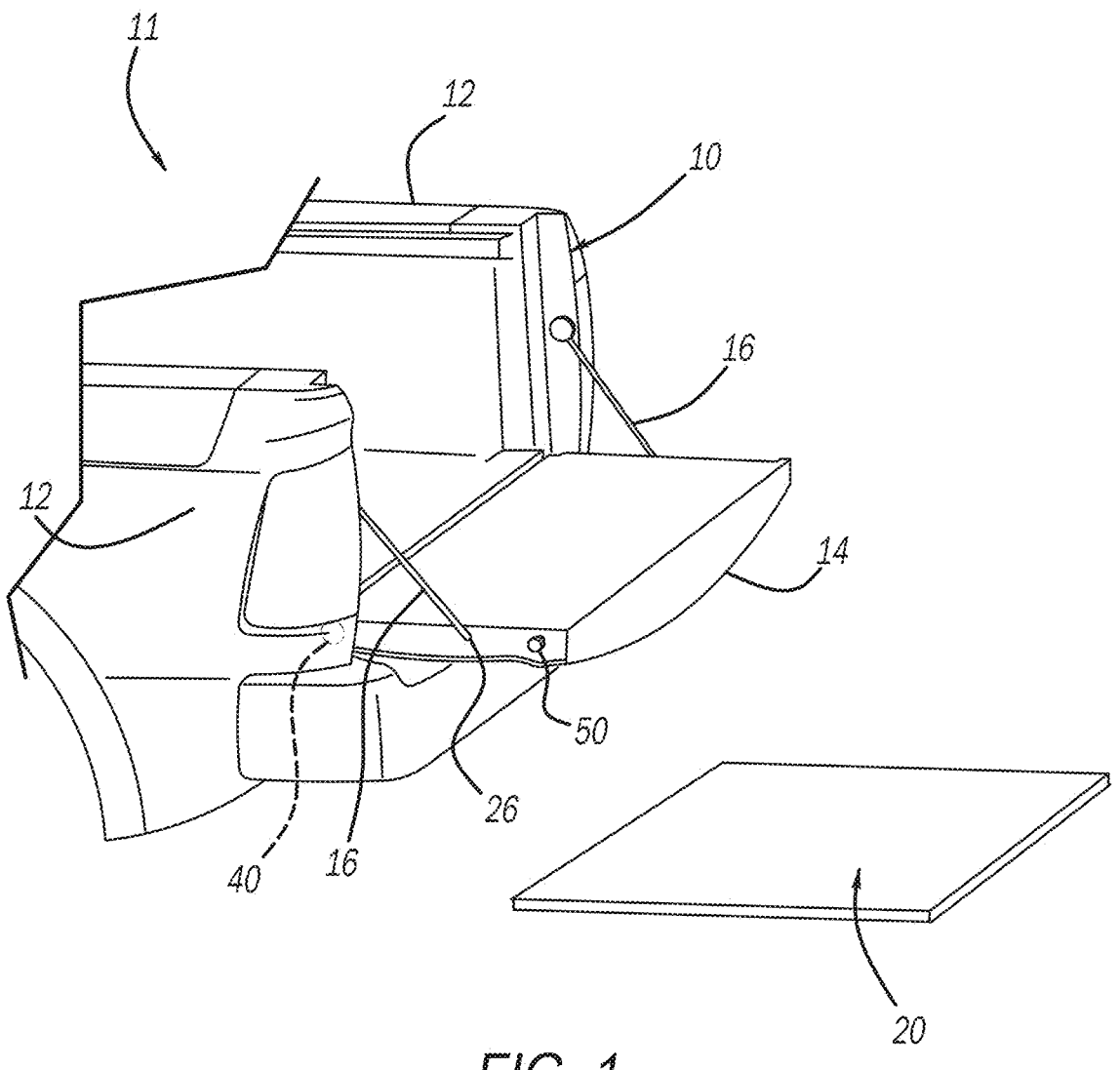
FIG. 1 is a schematic view of a truck bed with a tailgate in a partially open position.

Example embodiments will now be described more fully with reference to the accompanying drawings.

Turning to the figures, a pickup truck bed or cargo box is illustrated and designated with the reference numeral 10. The cargo box 10 is part of a vehicle 11 including sidewalls 12 and a tailgate 14. The tailgate 14 includes cables 16 that secure the tailgate 14 with the cargo box 10. Also, the tailgate 14 pivots at the base of the cargo box 10.

Figure 2:
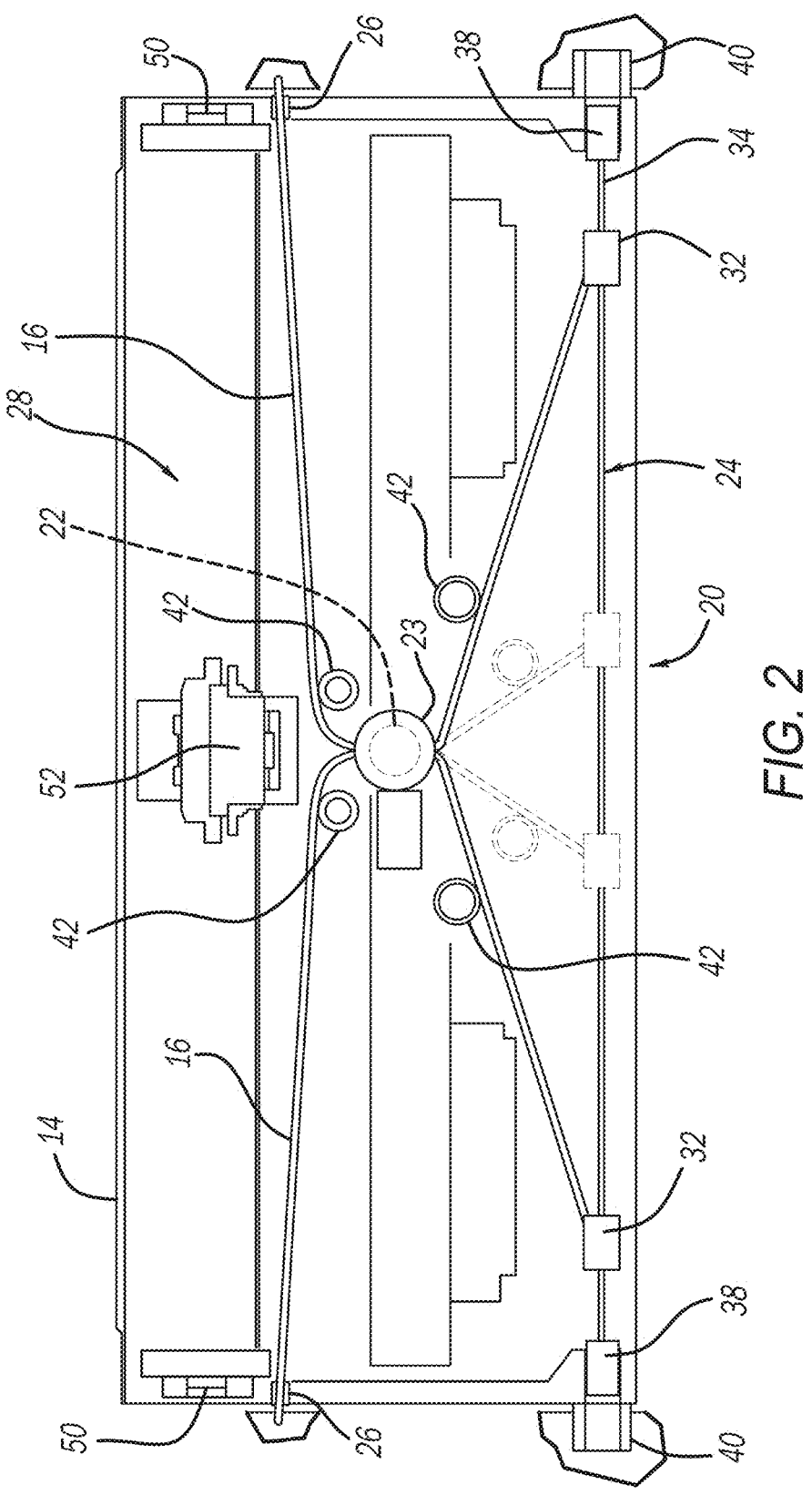
FIG. 2 is a schematic plan view of an interior of the tailgate.

The tailgate 14 includes a cable driven power tailgate system 20 (shown schematically in FIG. 1 outside of the tailgate 14) positioned inside of the tailgate 14 (FIG. 2). The cable driven power tailgate system 20 includes the cables 16, a motor or actuator 22, and a spindle assembly 24. Cable driven power tailgate system 20 includes two cables 16, one on each side of the tailgate 14. The cables 16 are substantially identical and the discussion with one will apply to both. One end of the cables 16 is attached to the cargo box 10. The cables 16 then enter through a bearing surface 26 into a cavity 28 of the tailgate 14. The cables 16 are wrapped around a sleeve 23 of the motor/actuator 22. Ordinarily, there are pulley bearings that keep tension in the cables 16. The sleeve 23 is rotated in clockwise and counterclockwise directions by the motor/actuator 22 which, in turn, enables the cables 16 to move in two directions. The other ends of the cables 16 are secured to a nut 32 that is positioned onto a spindle 34 of the spindle assembly 24. Thus, as the motor/actuator 22 is activated, the cables 16 are rotated around the sleeve 23, which moves the nuts 32 from a first closed position to a second open position illustrated by the dash lines of the cables 16 in FIG. 2. As the nuts 32 are pulled along the spindle 34 from its first to second position, the spindle 34 is rotated. The spindle 34 is coupled with a pair of gear boxes 38. The gear boxes 38 are secured to hinges 40 that are coupled with a pivot of the tailgate 14 on the cargo box 12. The gear boxes 38 have gears (not shown) which are coupled with or meshed with a gear (not shown) on the hinge pin (not shown) of the tailgate 14. Thus, as the gears of the gear boxes 38 are rotated by the spindle 34, rotate the gears of the gear boxes 38 the gears (not shown) that are coupled with the tailgate pin to rotate the tailgate 14 to an opened position.

Also, pulleys 42 with bearing tensioners are positioned onto the cables 16 so that as the cables 16 move from the open to closed position (i.e., the first and second positions) on the spindle 34, the pulleys 42 take up the slack in the cables 16 to provide constant tension on the cables 16 during operation of the cable driven power tailgate system 20.

In order to raise the tailgate 14 from the open position to the closed position, the sleeve 23 is rotated by the motor/actuator 22 in the reverse direction. This moves the nuts 32 along the spindle 34 from the second position (shown in phantom in FIG. 2) back to the first position at the ends of the spindle 34. As this occurs, due to the rotation of the sleeve 23, the cables 16 are tightened wherein the cables 16 move along the bearing surfaces 26 to move the cables 16 upward which, in turn, closes the tailgate 14. Latches 50 of the tailgate 14 can then secure the tailgate 14 to the cargo box 12. The latches 50 can be activated via a handle 52 of the tailgate 14, which can enable the tailgate cable driven system 20 to operate when the latches 50 are released. This release can happen via an electronic controller or could be done manually.

Also, the gear box 38 has a mechanism that is activated upon reverse of the motor/actuator 22. Upon reverse of the motor/actuator 22, the gear boxes 38 rotate the spindle 34 in a reverse direction moving the nuts 32 from a middle position (shown in phantom in FIG. 2) towards its end position which, in turn, pulls on the cables 16 to move the tailgate 14 from a lowered to a closed position. The gear boxes 38 could have a reverse clutch or the like that enables it to spin upon release of the tension by the nuts 32 causing the gear boxes 38 to spin in reverse which, in turn, spins the spindle 34.

The motor/actuator 22 is generally positioned at the center of the cavity 28. Thus, there is plenty of space for the motor/actuator 22 in the cavity 28 of the tailgate 14. Likewise, the spindle 34 is positioned near the bottom edge of the tailgate 14 away from the latch. Thus, there is plenty of space for the mechanism 20 within the interior 28 of the tailgate 14.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A tailgate for a vehicle having a cargo box, comprising:
   a tailgate body defining a hollow interior; and
   a cable driven power tailgate system positioned within the hollow interior of the tailgate body, the cable driven power tailgate system including:
   a pair of cables, each of the cables having a first end configured to be attached to the cargo box and an opposite second end;
   a spindle assembly including a spindle and a pair of nuts attached to and configured to move along the spindle, wherein the opposite second end of each of the cables is attached to a respective one of the pair of nuts;
   a circular sleeve that is rotatable in clockwise and counter-clockwise directions, each of the cables being engaged with the circular sleeve; and
   a motor configured to rotate the circular sleeve in the clockwise and counter-clockwise directions,
   wherein rotation of the circular sleeve by the motor moves the cables which moves the nuts along the spindle between a first position where the tailgate body is in a closed position relative to the cargo box and a second position where the tailgate body is in an open position relative to the cargo box.

2. The tailgate according to claim 1, wherein the cable driven power tailgate system includes a plurality of tensioners in contact with the cables and which tension on the cables as the tailgate body moves between the closed position to the open position.

3. The tailgate according to claim 1, wherein the cable driven power tailgate system includes a pair of gear boxes attached to opposing ends of the spindle, and the pair of gear boxes are configured to control a speed of rotation of the spindle as the tailgate body is moved between the closed position and the open position.

4. The tailgate according to claim 3, wherein the gear boxes are configured to be coupled to pivot hinges of the cargo box.

5. The tailgate according to claim 1, wherein the tailgate body includes a pair of bearing surfaces that permit the cables to slide therealong and exit the tailgate body.

6. The tailgate according to claim 1, wherein the circular sleeve is positioned at a center of the hollow interior of the tailgate body.

* * * * *